US007298256B2

(12) United States Patent
Sato et al.

(10) Patent No.: US 7,298,256 B2
(45) Date of Patent: Nov. 20, 2007

(54) CRISIS MONITORING SYSTEM

(75) Inventors: Nobuo Sato, Kokubunji (JP); Yasunari Obuchi, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 11/043,169

(22) Filed: Jan. 27, 2005

(65) Prior Publication Data

US 2005/0264425 A1 Dec. 1, 2005

(30) Foreign Application Priority Data

Jun. 1, 2004 (JP) ............................ 2004-163328

(51) Int. Cl.
*G10L 21/00* (2006.01)
*G10L 11/00* (2006.01)
*G08B 1/08* (2006.01)
*H04Q 7/00* (2006.01)

(52) U.S. Cl. ............................ 340/539.11; 340/539.12; 340/539.15; 704/274

(58) Field of Classification Search .............................. 340/539.1–539.32, 3.3–3.32, 146.2, 500–538.1; 704/200.1, 274
See application file for complete search history.

(56) References Cited

U.S. PATENT DOCUMENTS 6,151,571 A * 11/2000 Pertrushin .................. 704/209
7,062,443 B2 * 6/2006 Silverman et al. .......... 704/274
2005/0258958 A1 * 11/2005 Lai ...................... 340/539.15

FOREIGN PATENT DOCUMENTS

| | | |
|---|---|---|
| JP | 2001-080833 | 3/2001 |
| JP | 2002-133558 | 5/2002 |
| JP | 2004-048164 | 2/2004 |

* cited by examiner

*Primary Examiner*—Benjamin C. Lee
*Assistant Examiner*—Jennifer Mehmood
(74) *Attorney, Agent, or Firm*—Antonelli, Terry, Stout & Kraus, LLP.

(57) ABSTRACT

Provided is a crisis monitoring system that detects a crisis by identifying a person's emotion from his/her utterance includes an input unit to which an audio signal is inputted, a recording unit which records information necessary to judge a crisis situation, and a control unit which controls the input unit and the recording unit. The recording unit records emotion attribute information, which includes a feature of a specific emotion in an audio signal, and the control unit determines a person's emotion by comparing an audio signal inputted to the input unit with the emotion attribute information, and executes a predetermined emergency processing when it is judged that the determined emotion indicates a crisis situation.

16 Claims, 14 Drawing Sheets

FIG.3

300

| | ITEM | VALUE |
|---|---|---|
| 301 | DATE | FEBRUARY 10 |
| 302 | STARTING TIME | 23 : 10 : 30 |
| 303 | CLOSING TIME | 23 : 10 : 50 |
| 304 | STARTING POSITION | FIRST FLOOR |
| 305 | CLOSING POSITION | THIRD FLOOR |
| 306 | OBSERVATION RESULT | NEUTRAL |
| 307 | MONITORING RESULT | GOOD CONDITION |
| 308 | OBJECT PERSON | HANAKO HITACHI |
| 309 | ROOM NUMBER | ROOM 302 |
| 310 | EMERGENCY CONTACT ADDRESS | O-O-O HITACHI-CHO HITACHI CITY |
| 311 | EMERGENCY RESPONSE | PHONE A CONTROL CENTER |

703 704 705 706 707

| ITEM | VALUE 1 | VALUE 2 | VALUE 3 | VALUE 4 | VALUE 5 |
|---|---|---|---|---|---|
| 701 ANGRY | 9.2 | 5.3 | −9.1 | 10.1 | 3.2 |
| 702 CRY | −2.3 | 23.1 | −9.1 | −98.1 | 1.2 |

FIG.8

800

| | ITEM | VALUE 1 (803) | VALUE 2 (804) | VALUE 3 (805) | VALUE 4 (806) | VALUE 5 (807) |
|---|---|---|---|---|---|---|
| 801 | SHOOTING SOUND OF HANDGUN | 9.2 | 5.3 | -9.1 | 10.1 | 3.2 |
| 802 | BROKEN SOUND OF GLASS | -2.3 | 23.1 | -9.1 | -98.1 | 1.2 |

FIG.9

900

| | ITEM | CONTENT |
|---|---|---|
| 901 | NAME | HANAKO HITACHI |
| 902 | ID | 0001 |
| 903 | ROOM NUMBER | ROOM 302 |
| 904 | EMERGENCY CONTACT ADDRESS | ○-○-○ HITACHI-CHO HITACHI CITY |
| 905 | ALERT WORD | HIRAKEGOMA |
| 906 | VALUE 1 | 7.2 |
| 907 | VALUE 2 | 3.5 |
| 908 | VALUE 3 | 0.2 |
| 909 | VALUE 4 | -92.1 |
| 910 | VALUE 5 | 3.2 |

1301, 1302, 1303, 1304, 1305

| CRISIS MONITORING EQUIPMENT No. | INSTALLATION FLOOR | INSTALLATION LOCATION | OPERATIVE CONDITION | MONITORING RESULT |
|---|---|---|---|---|
| 1 | 1F | POSTAL APARTMENT | WAITING | GOOD CONDITION |
| 2 | 1F | THE NEIGHBORHOOD OF ROOM 101 | WAITING | GOOD CONDITION |
| ⋮ | ⋮ | ⋮ | ⋮ | ⋮ |
| X-1 | 5F | THE NEIGHBORHOOD OF ROOM 509 | OBSERVING | GOOD CONDITION |
| X | 5F | THE NEIGHBORHOOD OF ROOM 510 | WAITING | GOOD CONDITION |

FIG.19

1901 1902 1903 1904 1905

| MONITORING SETTING No. | ADDRESS | LATITUDE | LONGITUDE | TIME |
|---|---|---|---|---|
| 1 | ○○-CHO KOKUBUNNJI CITY TOKYO | 12 DEGREES～13 DEGREES | 32 DEGREES～33 DEGREES | 20:00～23:00 |
| 2 | | | | |
| ⋮ | ⋮ | ⋮ | ⋮ | ⋮ |
| X-1 | | | | |
| X | | | | |

1900

2101 2102 2103 2104 2105

| USER ID | USER NAME | ADDRESS | OPERATIVE CONDITION | MONITORING RESULT |
|---|---|---|---|---|
| 1 | HANAKO HITACHI | 1-CHOME HIGASHI-KOIGAKUBO KOKUBUNNJI CITY TOKYO | OBSERVING | BAD CONDITION |
| 2 | TARO YAMADA | 1-CHOME IZUMI-CHO KOKUBUNNJI CITY TOKYO | OBSERVING | GOOD CONDITION |
| ⋮ | ⋮ | ⋮ | ⋮ | ⋮ |
| X | N | AKANUMA HATOYAMA-CHO HIKI-GUN SAITAMA | WAITING | GOOD CONDITION |

2100

CRISIS MONITORING SYSTEM

CLAIM OF PRIORITY

The present application claims priority from Japanese application P2004-163328 filed on Jun. 1, 2004, the content of which is hereby incorporated by reference into this application.

BACKGROUND OF THE INVENTION

This invention relates to a crisis monitoring system. In particular, the invention relates to a system that judges whether a person is in trouble or not from his/her utterance.

Molesters frequent in confined public spaces. In order to avoid being molested in an elevator, for instance, a person should stand by the operation panel of the elevator, and if a suspicious-looking person gets on the elevator, be watchful of this person's behavior, so he/she can stop the elevator with the use of the operation panel and escape as soon as he/she senses harm from this person.

A crisis monitoring system has been proposed to deal with such situations (JP 2001-80833 A). According to this technique, an image pickup camera picks up an image of the interior of an elevator car, an image identifying unit identifies the image picked up by the camera, and a car interior state identifying unit identifies a state in the elevator car. An anomaly judging unit judges, from results provided by the image identifying unit and the car interior state identifying unit, whether there is a disturbance in the elevator car or not. When a disturbance is detected, an anomaly judging unit notifies the caretaker office of the building of the disturbance.

Another technique that has been proposed obtains an acoustic wave issued from a preselected monitoring object as an acoustic signal, which is analyzed by an acoustic analyzing module of a sound recognition unit (JP 2002-133558 A). The results of the analysis are processed by a signal analyzing module to obtain analysis information on the target. When the obtained analysis information exceeds a given level, image signals and acoustic signals of the living quarters being recorded for monitoring are sent over the Internet to a monitoring device, which is set up in a remote place from the monitored space to play images and sounds of the monitored space.

Still another related technique is a break-in notifying system in which sensors placed on doors to and from a house, steps of a staircase in the house, a carpet on the floor, and the like sense an intruder and transmit radio waves to a server (or a phone) in the house to notify the server of the break-in (JP 2004-48164 A). Receiving the radio waves, the server sends a break-in notification to a predetermined address via a communication line. The break-in notifying system enables a user away from his/her home to know of a break-in and to deal with it promptly.

SUMMARY OF THE INVENTION

According to the conventional techniques, none of the techniques are helpful to a person trapped with a molester in a confined public space where is little room to move away from the molester, and the victim cannot expect to be heard by anyone if he/she yells for help. Further, it is difficult for the victim to escape from the scene. As the countermeasure, in the case of an elevator, there is no other method than to stand by the operation panel and other such method for avoiding harm from the molestation. Therefore, the only thing the victim of the molestation can do is to operate the operation panel or use the emergency call and wait for the elevator to stop.

This invention has been made in view of the above, and it is therefore an object of this invention to provide a crisis monitoring system that detects a crisis by identifying a person's emotion from his/her utterance.

A crisis monitoring system according to an embodiment of this invention to judge whether a person is in a crisis situation, includes an input unit to which an audio signal is inputted, a recording unit which records information necessary to judge a crisis situation, and a control unit which controls the input unit and the recording unit, and is characterized in that the recording unit records emotion attribute information, which includes a feature of a specific emotion in an audio signal, and characterized in that the control unit determines a person's emotion by comparing an audio signal inputted to the input unit with the emotion attribute information, and executes a predetermined emergency processing when it is judged that the determined emotion indicates a crisis situation.

The embodiment of this invention can detect a crisis in a public space visited by many people by picking up a person's utterance which is made upon encountering a crisis and by analyzing his/her emotion, as opposed to monitoring specific users who desire to use such monitoring services.

On the other hand, the embodiment of this invention can also monitor only users who desire crisis monitoring by using in combination a crisis monitoring equipment, which monitors the users to watch for a crisis, and a crisis monitoring terminal, which starts up monitoring by the crisis monitoring equipment.

BRIEF DESCRIPTION OF THE DRAWINGS

The present invention can be appreciated by the description which follows in conjunction with the following figures, wherein:

FIG. 3 is a configuration diagram of a condition database according to the first embodiment;

FIG. 8 is an explanatory diagram of a crisis sound database according to the first embodiment;

FIG. 9 is an explanatory diagram of personal information management table according to the first embodiment;

FIG. 19 is an explanatory diagram of a monitoring area database according to the third embodiment;

DETAILED DESCRIPTION OF THE PREFERRED EMBODIMENTS

Embodiments of this invention will be described below with reference to the accompanying drawings.

First Embodiment

Figure 1:
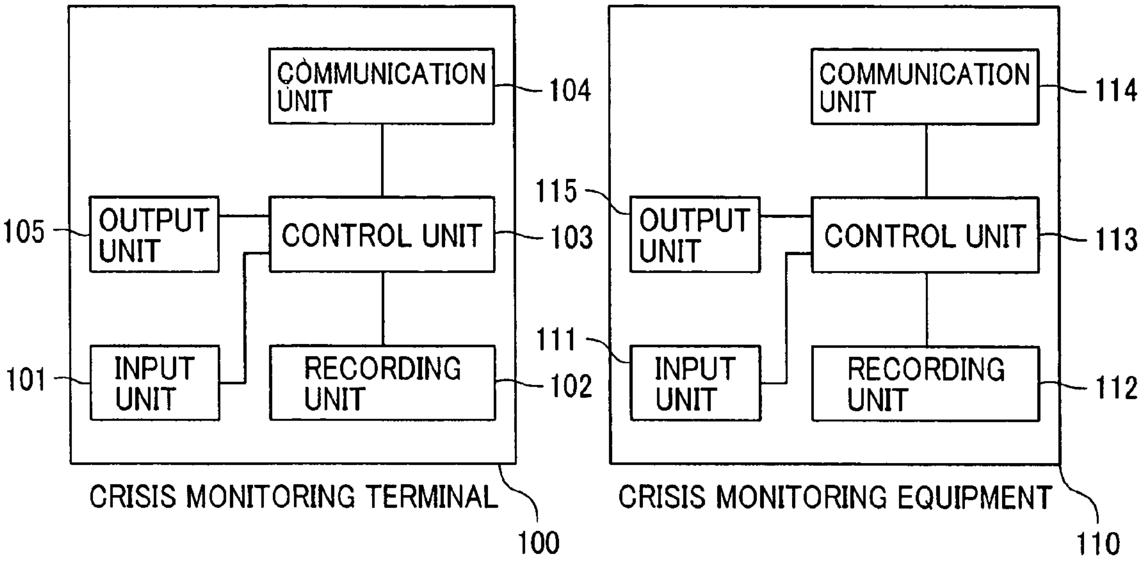
FIG. 1 is a block diagram of a crisis monitoring system according to a first embodiment of this invention.

FIG. 1 is a block diagram of a crisis monitoring system according to a first embodiment of this invention.

A crisis monitoring terminal 100 is a terminal which transmits a signal to start up a crisis monitoring equipment 110, and is carried around by a user who desires crisis monitoring. The crisis monitoring terminal 100 is composed of an input unit 101, a recording unit 102, a control unit 103, a communication unit 104 and an output unit 105.

The input unit 101 is constituted of a touch panel or a switch, and receives an input to operate the crisis monitoring terminal 100. The input unit 101 may also be equipped with a microphone through which a user's voice is inputted, a camera by which an image is inputted, or a keyboard or a mouse with which data is inputted.

The recording unit 102 is constituted of a hard disk or a memory. The recording unit 102 stores a main program to request observation and a personal information management table 900 which contains user's personal information as shown in FIG. 9.

The control unit 103 has a CPU to execute the main program stored in the recording unit 102 and to request the crisis monitoring equipment 110 to observe.

The communication unit 104 communicates with the crisis monitoring equipment 110 over radio (or by infrared rays). The communication unit 104 may also be communicable with other external devices.

The output unit 105 is constituted of a liquid crystal display to display various data concerning crisis monitoring, and/or a speaker to output sounds.

The crisis monitoring equipment 110 is an apparatus which watches for a crisis in a monitoring area upon receiving a monitoring starting signal from the crisis monitoring terminal 100, and is installed in a monitoring area (for example, elevators and like other public spaces). The crisis monitoring equipment 110 is composed of an input unit 111, a recording unit 112, a control unit 113, a communication unit 114 and an output unit 115.

The input unit 111 is constituted of input devices such as a microphone through which a user's voice is inputted. The input unit 111 may also be equipped with a camera by which an image is inputted, and a touch panel, a keyboard or a mouse with which data is inputted.

The recording unit 112 is constituted of a hard disk or a memory. The recording unit 112 stores a speech emotion recognition program which analyzes a voice inputted, a condition database 300 which is shown in FIG. 3, audio data, and visual data.

The control unit 113 has a CPU. When there is a disturbance, The control unit 113 executes an emergency processing using the speech emotion recognition program which is stored in the recording unit 112.

The communication unit 114 communicates with the crisis monitoring terminal 100 over radio (or by infrared rays). The communication unit 114 also communicates with a control center (omitted from the drawing) over a cable (e.g. a public switched telephone network or the Internet). The communication unit 114 may communicate with other external devices.

The output unit 115 is constituted of a liquid crystal display to display various data concerning crisis monitoring, and/or a speaker to output sounds.

When the crisis monitoring terminal 100 request to observe, the crisis monitoring equipment 110 monitors a monitoring area and analyzes a person's emotion from voice information received by the input unit 111. In the case where an angry shout or a scream is observed indicating a disturbance, the crisis monitoring equipment 110 judges that an abnormal situation has occurred (e.g., molestation or robbery) and the communication unit 114 sends alerts the control center.

Figure 2:
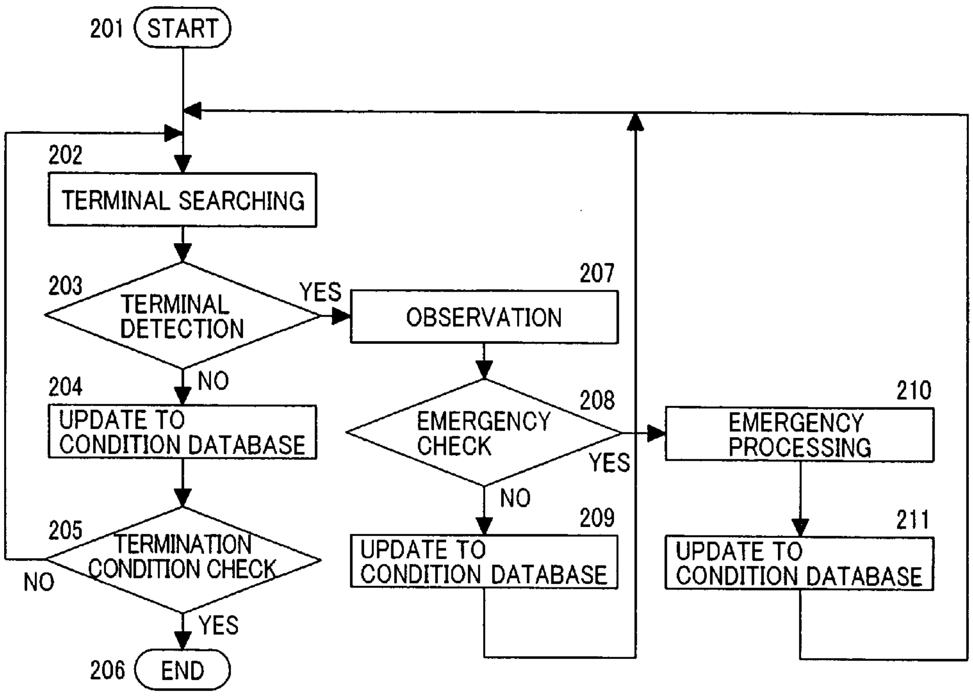
FIG. 2 is a flow chart of monitoring processing by a crisis monitoring equipment according to the first embodiment.

FIG. 2 is a flow chart of monitoring processing by the crisis monitoring equipment 110 according to the first embodiment.

When the crisis monitoring equipment 110 is activated (step 201), the crisis monitoring equipment 110 first sends an inquiry signal at a given timing to perform terminal search processing, which is for finding out whether the crisis monitoring terminal 100 has entered a communicable area (the communicable area includes the monitoring area such as an elevator) or not (step 202).

In step 203, When the crisis monitoring equipment 110 receives a response signal from the crisis monitoring terminal 100, the crisis monitoring equipment 110 judges that the crisis monitoring terminal 100 has entered the communicable area (the monitoring area). And then the crisis monitoring equipment 110 starts observation of the monitoring area (step 207).

On the other hand, the crisis monitoring equipment 110 does not receives a response signal from the crisis monitoring terminal 100, the crisis monitoring equipment 110 records the present condition in the recording unit 112 (step 204). When the crisis monitoring equipment 110 does not receive response signal from the crisis monitoring terminal 100, it means that the crisis monitoring terminal 100 has not entered the communicable area yet, or that the crisis monitoring terminal 100 has moved out of the communicable area. Alternatively, it is when the user operates the crisis monitoring terminal 100 not to want monitoring that the crisis monitoring equipment 110 receives no response signal from the crisis monitoring terminal 100.

The present condition is recorded in the condition database 300 of the recording unit 112. Data recorded in the database is sent at a given timing to the control center through the communication unit 114. The record in the condition database 300 may be sent as it is to the control center.

Thereafter, the crisis monitoring equipment 110 judges, through termination judging processing, whether to conduct a further terminal search (step 205). In the case where the crisis monitoring equipment 110 is to stop operating (for example, when a command to stop observation is inputted), the crisis monitoring equipment 110 stops to search the terminals (step 206). On the other hand, in the case where the crisis monitoring equipment 110 is to continue operating, the process returns to the step 202 to continue searching for the terminal.

Figure 5:
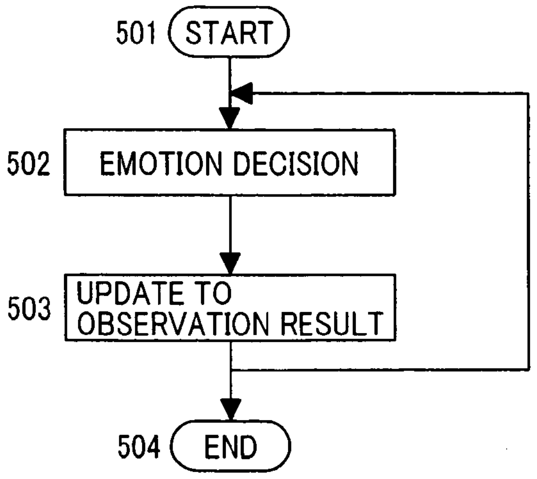
FIG. 5 is a flow chart of emotion detecting processing according to the first embodiment.

Starting observation (step 207), the crisis monitoring equipment 110 executes emotion detection processing of FIG. 5 based on voice information which is inputted through the input unit 111, to thereby judge whether the user is in trouble (step 208).

When it is judged that the user is not in any trouble, the crisis monitoring equipment 110 records the present condition in the condition database 300 (step 209). Then the processing returns to the step 202, where the crisis monitoring equipment 110 searches for the terminal.

On the other hand, when it is judged that the user is in trouble, the crisis monitoring equipment 110 follows emergency response 311 set in the condition database 300 and executes an emergency processing such as alerting the control center (step 210).

In emergency, the control unit 113 controls the respective units to execute predetermined processing.

In particular, the control unit 113 controls the communication unit 114 to have the unit 114 alert the control center. It is preferable for the communication unit 114 to send, at the same time as the reporting, to the control center, the present condition recorded in the recording unit 112 and the user's personal information recorded in the personal information management table 900. The user's personal information is transmitted using known encoding processing such as public key encryption in order to prevent third parties from reading the personal information.

The control unit 113 controls the output unit 115 to have the unit 115 play an audio or visual message saying that the control center is being alerted.

The control unit 113 may control automatic running of the elevator. In particular, the control unit 113 controls the elevator that is in operation such that the elevator car stops and opens its doors to the closest floor, or the floor where the building manager's office is located, and controls the elevator that is not moving such that the elevator car remains unmoving and keeps its doors open.

For automatic running of the elevator, the control unit 113 sends commands such as a halting command to an elevator controllers from the communication unit 114. Alternatively, the control unit 113 may send a command to automatically run the elevator from the communication unit 114 to an elevator controller that is located at an elevator control center or at a security company contracted to guard the building, thereby having the external elevator controller operate the elevator.

Such automatic running of the elevator makes it possible to stop the elevator on a given floor and rescue a user in the elevator car when, for example, the user is unable to operate the elevator. In addition, the perpetrator is prevented from operating the elevator when the elevator is run automatically.

Preferably, the emergency processing is varied from user to user to suit wills of individual users by recording the above-described control method in the personal information management table 900.

The control method given in the above is merely an example, and other control methods can be employed to ensure the safety of users.

As the emergency processing (step 210) is completed, the crisis monitoring equipment 110 records the present condition in the recording unit 112 to update the condition database 300 (step 211). The process then returns to the step 202, where the crisis monitoring equipment 110 searches for the crisis monitoring terminal 100.

The crisis monitoring equipment 110 is set to constantly monitor the crisis monitoring terminal 100 once the crisis monitoring terminal 100 enters the communicable area. Alternatively, the crisis monitoring equipment 110 is set to automatically start monitoring when the user holding the crisis monitoring terminal 100 enters the communicable area in a specific time zone such as late at night. The crisis monitoring equipment 110 may also be set to start monitoring when a load sensor placed at where an elevator hoist cable is attached senses a weight heavier than the weight of the user. It is also possible to set the crisis monitoring equipment 110 in a manner that makes the crisis monitoring equipment 110 stop monitoring when a given period has elapsed after the crisis monitoring terminal 100 enters the communicable area. These settings may be combined with one another and various other settings are employable. What setting of the crisis monitoring equipment 110 a user prefers is set in advance in the personal information management table 900.

Audio data inputted through the input unit 111 is preferably stored in the recording unit 112. The stored audio data can be used in identifying the person who has committed an offence against the user during observation. A camera may be employed to observe images. Images of the interior of the elevator car picked up by the camera are preferably stored in the recording unit 112, so that the stored images can be used in identifying a suspect.

However, it is advisable to quickly delete audio, visual or other data stored in the recording unit 112 in the case where monitoring is ended without detecting any trouble, since the recorded data contains a lot of personal (private) information.

FIG. 3 is a configuration diagram of the condition database 300.

The condition database 300 is placed in the recording unit 112 of the crisis monitoring equipment 110. The condition database 300 includes a date 301, a starting time 302, a closing time 303, a starting position 304, a closing position 305, an observation result 306, a monitoring result 307, a object person 308, an room number 309, an emergency contact address 310 and an emergency response 311.

A date 301 is a date when the user uses the system (in other words, when the user's condition is observed). A starting time 302 is a time the system is activated by an observation request from the crisis monitoring terminal 100. A closing time 303 is a time the system stops operating as the crisis monitoring terminal 100 moves out of the communicable area or from other reasons.

A starting position 304 is a location where the system is activated by an observation request from the crisis monitoring terminal 100. A closing position 305 is a location where the system stops operating as the crisis monitoring terminal 100 moves out of the communicable area or from other reasons. In the example of FIG. 3, this particular user gets on the elevator on the first floor, gets off the elevator on the third floor, and then moves out of the monitoring area.

An observation result 306 is the result of observation at step 207 in FIG. 2. A monitoring result 307 is the result of monitoring which is judged from the observation result 306, and whether condition is good or bad is recorded as the monitoring result 307.

For instance, when it is judged that a user to be in trouble from an angry shout or a scream observed, “trouble” is recorded as the monitoring result 307. On the other hand, when it is judged that nothing is out of ordinary in the monitoring area, “normal” is recorded as the monitoring result 307. In the case where more than one type of observation is to be made (for example, sound observation and image observation), several types of data are recorded as the observation result 306 and judged in a comprehensive manner to produce the monitoring result 307.

The object person 308 is the user who has activated the crisis monitoring equipment 110, that is the object of monitoring.

The room number 309 is the number of the apartment where the object person 308 resides. In the case where this crisis monitoring system is installed in a public space instead of a housing complex or the like, the address of the object person is set in place of the room number 309. An emergency contact address 310 is where the user desires to have the system make a contact in emergencies. The address of next of kin of the object person 308 or the like is recorded as the emergency contact address 310.

The emergency response 311 is what the user desires to have the system do in emergencies. It is not always necessary to newly set the emergency response 311 and the default setting such as calling to the control center may be employed. It is also possible to set different response for different monitoring areas (for example, inside the elevator or in the corridor). The emergency response 311 may also vary from user to user in accordance with the method recorded in the personal information management table 900. Other various settings can be employed for the emergency response 311.

The room number 309, the emergency contact address 310, and the emergency response 311 are predetermined.

Items to be recorded in the condition database 300 are not limited to those shown in FIG. 3, and an item can be removed or added as needed. Preferably, the condition database 300 holds a condition history as well as the present condition by accumulating data in the recording unit 112 instead of overwriting each time monitoring is completed. The accumulated data can be used in checking the past condition.

Figure 4:
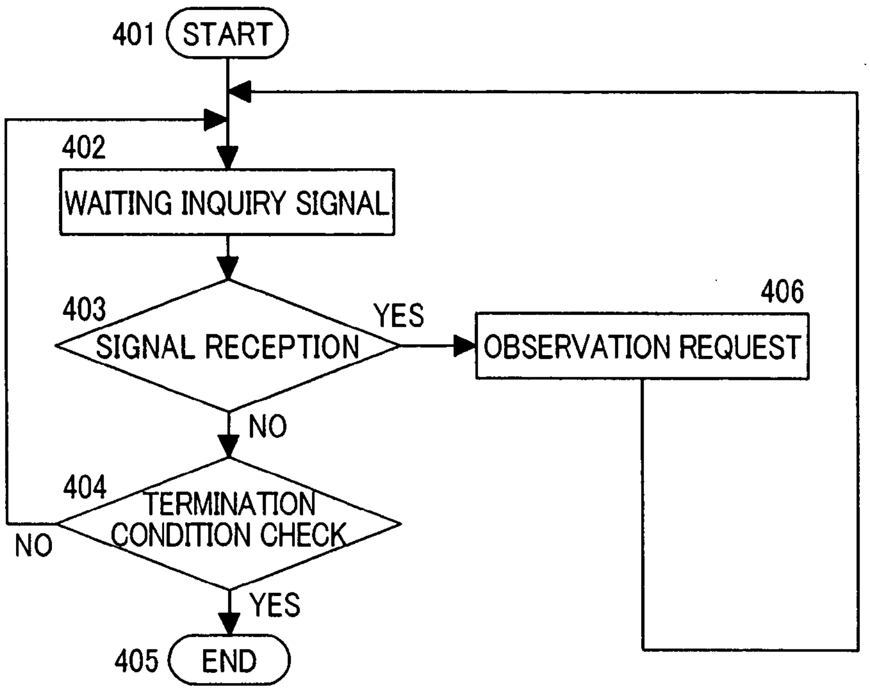
FIG. 4 is a flow chart of processing by a crisis monitoring terminal according to the first embodiment.

FIG. 4 is a flow chart of processing by the crisis monitoring terminal 100 according to the first embodiment.

When the crisis monitoring terminal 100 is activated (step 401), once inside the communicable area, the crisis monitoring terminal 100 enters a watching state in which the terminal is ready to receive an inquiry signal sent from the crisis monitoring equipment 110 (step 402).

When an inquiry signal from the crisis monitoring equipment 110 is received (step 403), the crisis monitoring terminal 100 uses the communication unit 104 to send a response signal to the crisis monitoring equipment 110 and request the apparatus to start observation (step 406).

The crisis monitoring terminal 100 preferably sends personal information of the user recorded in the personal information management table 900, which is placed in the recording unit 102, along with the response signal, to the crisis monitoring equipment 110. Sending user’s information which has been registered in advance enables the crisis monitoring equipment 110 to execute, when a disturbance is detected, the emergency response 311 that suit wills of individual users. In addition, by consulting the personal information management table 900, the crisis monitoring equipment 110 can monitor each user in a manner that corresponds to his/her condition regarding personal information desired monitoring hours.

When an inquiry signal is not received from the crisis monitoring equipment 110 in the step 403, the crisis monitoring terminal 100 does not send a response signal and judges whether the user has operated the terminal to end monitoring (step 404).

When detecting that it is operated to end monitoring, the crisis monitoring terminal 100 ends the process (step 405). On the other hand, when the crisis monitoring terminal 100 does not detect that it is operated to end monitoring, the process returns to the step 402 where the crisis monitoring terminal 100 watch an inquiry signal from the crisis monitoring equipment 110.

FIG. 5 is a flow chart of processing executed by the crisis monitoring equipment 110 to detection a user’s emotion from the result of observation.

When the emotion detecting processing is started (step 501), the crisis monitoring equipment 110 decides an emotion from a user’s voice inputted (step 502). This emotion detection is based on person’s utterance. First, the inputted voice is analyzed and emotion detecting processing shown in FIG. 6 is applied.

The emotion level may be used to judge a crisis. The level of an emotion can be obtained by counting how many times utterances conveying a specific emotion are made in a unit time, for instance, how many times angry words are spoken in 30 seconds. The higher the count of utterances conveying a specific emotion, the higher the level of the emotion. A higher emotion level is judged to indicate the greater seriousness of a crisis.

In the case where the observation result can be converted into numeric values (emotion level), e.g. anger level is 60%, a crisis can be judged with a predetermined threshold as reference.

Figures 6, 7:
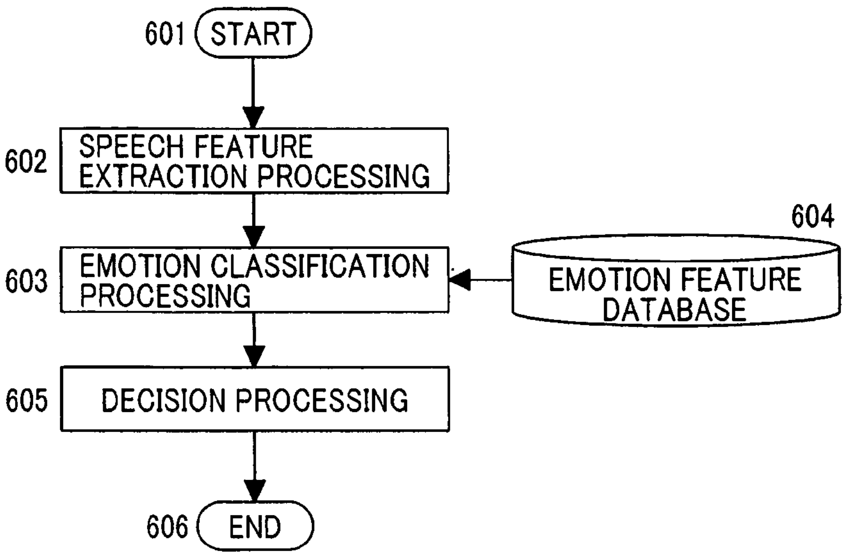
FIG. 6 is a flow chart of emotion detecting processing by the crisis monitoring terminal according to the first embodiment.
FIG. 7 is an explanatory diagram of an emotion database according to the first embodiment.

Counting the number of times utterances conveying a specific emotion are made is merely an example of how to obtain the emotion level, and it is also possible to calculate the emotion level from a discriminant function value which is used in the emotion detection processing shown in FIG. 6.

The emotion detected is stored as an observation result in a predetermined storage area, for example a register (step 503). The main program reads the observation result out of the predetermined storage area to make a final judgment about whether there is a disturbance (step 208).

When another voice input is received, an emotion is determined based on this audio data (step 502) and the determined emotion is stored as an observation result (step 503). Then, processing end in step 504.

FIG. 6 is a flow chart of the emotion detection processing by the crisis monitoring terminal 100 according to the first embodiment.

To determine an emotion from his/her voice, sounds heard in the communicable area are observed and the feature of an unusual sound (for example, an angry shout, a scream or a cry) is analyzed.

When the emotion detecting processing is started (step 601), first, a feature amount of a voice inputted through the input unit 111 is extracted (step 602). In the case where the feature amount is, for example, pitch, which shows highness or lowness of sound, the maximum pitch value in one utterance, the point at which the maximum pitch value is detected, the minimum pitch value, the point at which the minimum pitch value is detected, a mean pitch value and the like are extracted. In the case where the feature amount is energy, which represents the volume of sound, the maximum energy value in one utterance, the point at which the maximum energy value is detected, the minimum energy value, the point at which the minimum energy value is detected, a mean energy value and the like are extracted. Other known sound feature amounts may also be extracted.

Instead of employing the pitch, energy, tempo or the like of one utterance as a feature amount, the amount of change in pitch, energy, tempo or the like in a unit time may serve as a feature amount.

The extracted feature amount is classified with the use of a discriminant to thereby determine an emotion (step 603). A discriminant value is obtained from the general feature amount of a voice such as an angry shout or a scream which is learned in a preliminary study. The discriminant function value is calculated in a manner that sets the maximum value of anger to 1 and the normal state to −1.

The extracted voice feature amount is translated into numerical terms using the discriminant function. When the function value is a positive value, the emotion which the voice conveys is judged as anger. Whereas, the emotion is judged as neutral when the function value is a negative value. The emotion level can also be judged by reading strong anger from a large positive value of the function value and by reading solid neutral from a large negative value of the function value.

This method described above is merely an example to identify a person's emotion from his/her voice, and other known methods such as neural network analysis and multivariate analysis may be employed instead.

The emotion detection in the step 603 uses an emotion database 604 shown in FIG. 7. The emotion database 604 is a record of results obtained by conducting a preliminary study on the typical feature amount of a voice and by extracting a value using a discriminant function. A voice feature amount extracted through the voice feature extracting processing of the step 602 is compared against a corresponding feature amount recorded in the emotion database 604, to thereby identify an emotion from a voice inputted.

Then, in a step 605, specifically what emotion the utterer is feeling is determined from the result of the emotion detection of the step 603. Then, processing end in step 606.

How to determine an emotion is not limited to the method illustrated by the emotion detection flow chart shown in FIG. 6. In one alternative method, it is determined that detection of a specific emotion is made when words that are likely to convey a specific emotion, such as "Stop it!", are recognized.

Another alternative method uses manipulation of the input unit 111 in combination with speech emotion recognition. In this method, it is determined that a prescribed specific emotion is detected when a touch panel of the input unit 111 is touched or when a switch of the input unit 111 is operated.

Other information than a person's voice may be monitored as long as it shows what situation a user is in. A camera may be employed to observe user's behavior and determine that the user is feeling a specific emotion when a specific motion or a specific facial expression is detected.

Known speech emotion recognition techniques may also be employed to determine an emotion. In this case, a program to execute the technique of choice is stored in advance in the recording unit 112.

FIG. 7 is an explanatory diagram of the emotion database 604.

The emotion database 604 stores several types of emotion data in association with variables to make it possible to identify various emotions from a voice feature amount.

The emotion database 604 includes variable data of features of angry shout 701 and variable data of features of cry 702. Each of the variable data, angry shout and cry, includes variable values 703 to 707. The features of these voices are determined by the value of one or more such variables.

Preferably, other emotions that reflect a person's mind, such as tension and a feeling of being threatened, are also detected. The emotion database 604 can include other items than those shown in FIG. 7, and an item is removed or added as necessary.

FIG. 8 is an explanatory diagram of a crisis sound database 800.

Many other sounds than a voice uttered by a person can be used to judge whether the person is in trouble. For instance, the system may be set to judge that a user is in trouble when a gunshot sound, a sound of glass shattering, and like other sounds that indicate a trouble are observed.

Recorded in the crisis sound database 800 is a feature amount of a sound that could be heard in a crisis situation.

The crisis sound database 800 includes variable data of features of shooting sound of handgun 801 and variable data of features of broken sound of glass. Each of the variable data, gunshot sound and glass broken sound, includes variable values 803 to 807. The features of these sounds heard in a crisis situation are determined by the value of one or more such variables.

The crisis sound database 800 can include other items than those shown in FIG. 8, and an item is removed or added as necessary.

FIG. 9 is an explanatory diagram of a personal information management table 900.

User's personal information and characteristics are preferably used in judging a crisis. So that the personal information management table 900 is used to judge a crisis.

The personal information management table 900 includes a user's name 901, a user's ID 902 allotted to each user for identification, the room number 903 in a housing complex where the user resides, and emergency contact address 904 to contact in emergencies, such as the address of user's next of kin.

Further, the personal information management table 900 includes predetermined alert word 905 is an arbitrary keyword set in advance. Utterance of the alert word is another indicator of a crisis situation in addition to a scream let out in emergency.

Further, the personal information management table 900 includes variable values 906 to 910 which are characteristics of the voice of the user expressed in variables. The variable values 906 to 910 are registered by measuring in advance vocal sounds the user may make in emergencies. The variable values 906 to 910 constitute a reference database used in the emotion detection processing (step 603).

The personal information management table 900 can include other items than those shown in FIG. 9, and an item is removed or added as necessary. Consulting personal information and characteristics items in judging a crisis reduces the chance of making an erroneous judgment. The information in the personal information management table 900 can also be use as information to identify a user who is victimized.

As has been described above, the system according to the first embodiment detects a cry, an angry shout or the like in a confined public space such as an elevator by analyzing a person's emotion from his/her utterance, and reports the thus detected crisis situation. In this way, the system according to the first embodiment makes such spaces safe for its users.

Preferably, the crisis monitoring equipment 110 constantly monitors a user while the user is using the system of this embodiment since a crisis can happen anytime. Constant monitoring, however, involves the problem of privacy violations by catching users' voices and images when they do not desire crisis monitoring. This problem is cleared by holding observation by the crisis monitoring equipment 110 until a signal from the crisis monitoring terminal 100 is received. Thus the system is made available to a user only when the user desires monitoring.

The system that monitors for a limited period is also free from another drawback of constant monitoring, which is an increased chance of making an erroneous crisis judgment due to noise irrelevant to crisis monitoring and prolonged sound analysis time.

Second Embodiment

Figure 10:
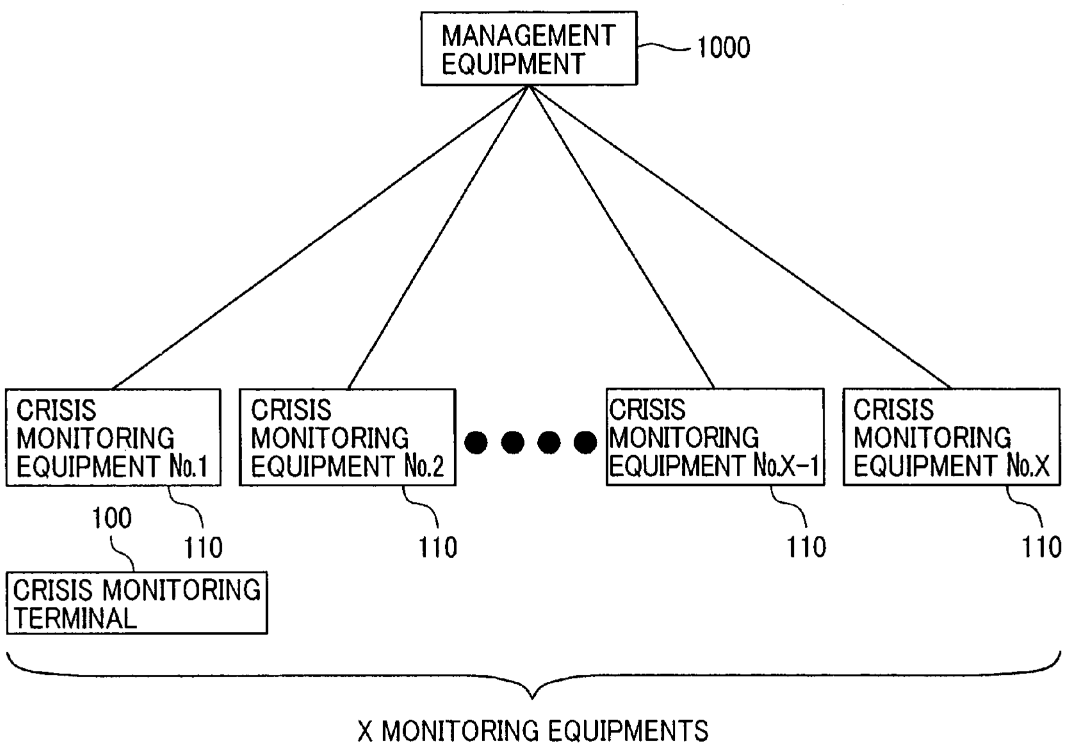
FIG. 10 is a block diagram of a crisis monitoring system according to a second embodiment of this invention.

FIG. 10 is a block diagram of a crisis monitoring system according to a second embodiment of this invention.

The crisis monitoring system of this embodiment monitors a crisis in a public space (e.g. a corridor in a housing complex) that is larger than spaces monitored in the first embodiment.

Plural crisis monitoring equipments 110 are installed in a monitoring area. For instance, the plural crisis monitoring equipments 110 are placed at given intervals in a housing complex from an entrance to an elevator hall, or from an elevator hall to the door of a user's room. The crisis monitoring equipments 110 each monitor a crisis in their respective communicable areas through the processing described in the first embodiment.

When requested from a user to observe, the crisis monitoring equipment 110 sends the present condition recorded in the recording unit 112. The present condition is sent at a given timing from the communication unit 114 to a management equipment 1000. The sends the present condition sent to the management equipment 1000 may be the entirety of or a part of a condition database 300.

The management equipment 1000 judges a crisis in the monitoring area of each crisis monitoring equipment 110 based on the present condition sent from the crisis monitoring equipment 110. The management equipment 1000 manages records sent from the plural crisis monitoring equipments 110, so that entire monitoring area is monitored for a crisis.

Figure 11:
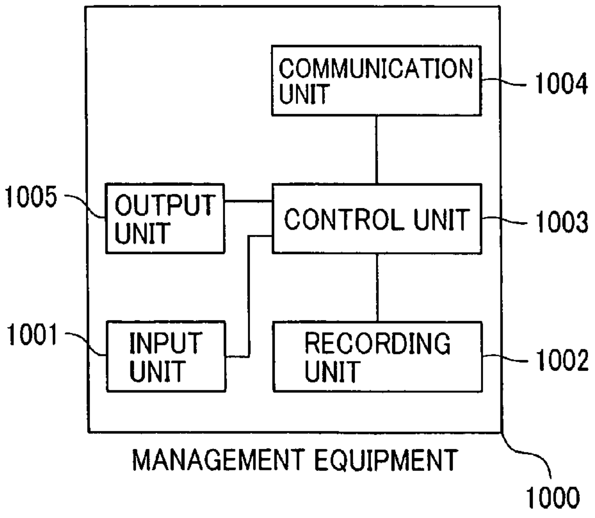
FIG. 11 is a block diagram of a management equipment according to the second embodiment.

FIG. 11 is a block diagram of the management equipment 1000.

The management equipment 1000 is an apparatus that manages the plural crisis monitoring equipments 110, and is set up in a location the entire monitoring area is managed (for example, the manager office of the complex).

The management equipment 1000 is composed of an input unit 1001, a recording unit 1002, a control unit 1003, a communication unit 1004 and an output unit 1005.

The input unit 1001 is constituted of an input device with which data is inputted, such as a touch panel, a switch, a keyboard or a mouse.

The recording unit 1002 is constituted of a hard disk or a memory to store a speech emotion recognition program, which analyzes a voice inputted, a management condition database 1300 (shown in FIG. 13), audio data, and visual data.

The control unit 1003 has a CPU and, when there is a disturbance, executes an emergency processing using the speech emotion recognition program which is stored in the recording unit 1002.

The communication unit 1004 communicates with the communication unit 114 of the crisis monitoring equipment 110 and with a control center (omitted from the drawing) over a cable (e.g. public switched telephone network or the Internet). The communication unit 1004 may also be communicable with other external devices.

The output unit 1005 is constituted of a liquid crystal display to display various data concerning crisis monitoring, and/or a speaker to output sounds.

Figures 12, 13:
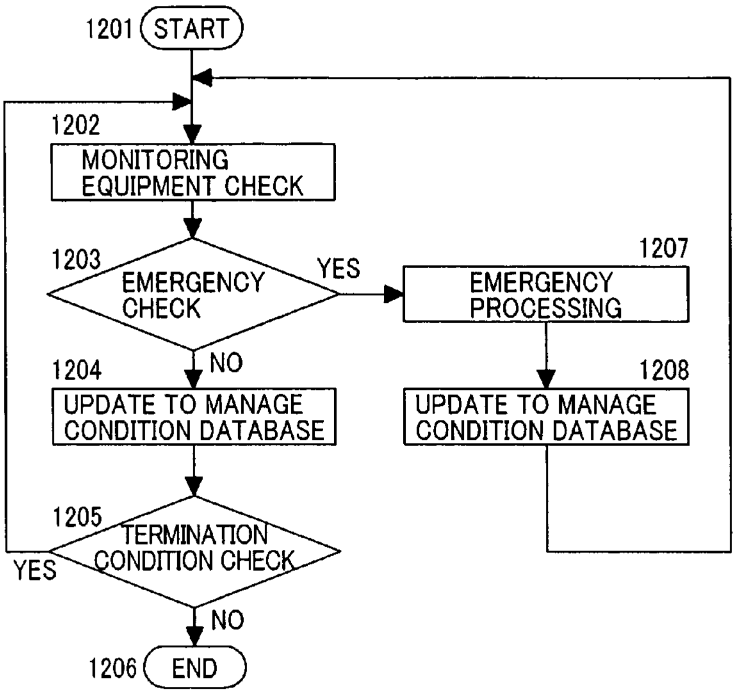
FIG. 12 is a flow chart of monitoring processing by the management equipment according to the second embodiment.
FIG. 13 is a configuration diagram of a management condition database according to the second embodiment.

FIG. 12 is a flow chart of monitoring processing by the management equipment 1000 according to the second embodiment.

The management equipment 1000 performs, on each crisis monitoring equipment 110, at a given timing (e.g. periodically), monitoring equipment checking processing to check the present operative condition of the crisis monitoring equipment 110 (step 1202). Through this processing, the crisis monitoring equipment 110 that has not received an observation request from a user is checked out to be in a stand-by state in which the crisis monitoring equipment 110 watches an observation request.

The management equipment 1000 receives an observing signal from the crisis monitoring equipment 110 that has received an observation request from a user. It is preferable for the crisis monitoring equipment 110 to send, to the management equipment 1000, along with the present condition, a personal information management table 900 which is user's personal information sent from a crisis monitoring terminal 100. The transmission of user's personal information preferably employs known encoding processing such as public key encryption in order to prevent third parties from reading the personal information.

The management equipment 1000 judges whether the user is in trouble from the present condition sent by the crisis monitoring equipment 110 (step 1203). As the user moves from one area to another, the management equipment 1000 judges whether the user is in trouble from the present condition sent by the crisis monitoring equipment 110 that is placed at where the user is now in (step 1203).

When it is found that the user is not in any trouble, the management equipment 1000 records the present condition of each crisis monitoring equipment 110 in the management condition database 1300 (step 1204). The current condition to be recorded is sent from the communication unit 1004 to the control center at a given timing. The present condition sent to the control center may be the entirety of or a part of the management condition database 1300.

Thereafter, the management equipment 1000 judges, through termination judging processing, whether to check the operative condition of the crisis monitoring equipments 110 further (step 1205). In the case where the management equipment 1000 is to stop operating (e.g. when a command to stop observation is inputted), the management equipment 1000 ends the processing of checking the monitoring equipments (step 1206). In the case where the management equipment 1000 is to continue operating, on the other hand, the processing returns to the step 1202 to keep checking the monitoring equipments.

When it is found in the step 1203 that the user is in trouble, the management equipment 1000 follows emergency response 311 set in the condition database 300 and executes an emergency processing such as alerting the control center (step 1207).

In emergency, the control unit 1003 controls the respective units in a predetermined manner.

Specifically, the control unit 1003 controls the communication unit 1004 to alert the control center. At this time, preferably, the communication unit 1004 also sends, to the control center, the present condition recorded in the recording unit 1002 and the user's personal information recorded in the personal information management table 900. The communication unit 1004 also controls the communication unit 1004 to receive sounds and images recorded in the recording unit 112 of the crisis monitoring equipment 110 that has detected the crisis situation.

The control unit 1003 controls the output unit 1005 to output an audio signal or visual message showing that the alert has been sent to control center.

The control method described above is merely an example, and other control methods can be employed to ensure the safety of users.

As the emergency processing (step 1207) is completed, the crisis management equipment 1000 records the present condition of each crisis monitoring equipment 110 in the management condition database 1300 (step 1208). Then the processing returns to the step 1202, where the management equipment 1000 resumes checking on the monitoring equipments.

FIG. 13 is a configuration diagram of the management condition database 1300.

The management condition database 1300 includes a crisis monitoring equipment number 1301, an installation floor 1302, an installation location 1303, an operative condition 1304 and a monitoring result 1305. A crisis monitoring equipment number 1301 is the number allotted to each crisis monitoring equipment 110. An installation floor 1302 is the number of the floor where each crisis monitoring equipment 110 is installed. An installation location 1303 indicates in what part of the installation floor the crisis monitoring equipment 110 is installed. The installation floor 1302 and the installation location 1303 may be combined into one to be recorded as installation location data.

An operative condition 1304 is the present operative condition of each crisis monitoring equipment 110. "Waiting" is recorded as the operative condition 1304 for the crisis monitoring equipment 110 that has not started observation yet. The crisis monitoring equipments 110 enter an "waiting" state when, for example, a user carrying the crisis monitoring terminal 100 is outside their communicable areas or when a user carrying the crisis monitoring terminal 100 is in their communicable areas but does not want their observation. For the crisis monitoring equipment 110 that has been requested from a user to observe, on the other hand, "observing" is recorded as the operative condition 1304.

A monitoring result 1305 is a judgment made on whether there is a disturbance or not from a user's voice and/or image observed by the crisis monitoring equipment 110.

Instead of the management equipment 1000, each crisis monitoring equipment 110 may judge a crisis through the emotion detection processing of FIG. 5 based on a user's voice and/or image observed. Specifically, each crisis monitoring equipments 110 sends an observation result 306 and a monitoring result 307, which is determined based on the observation result 306, to the management equipment 1000.

When the management equipment 1000 judges whether a user is in trouble, the management equipment 1000 may receive the user's voice and/or image observed by the crisis monitoring equipments 110, and performs the emotion detection processing shown in FIG. 5 on the received data with the use of the speech emotion recognition program stored in the recording unit 1002. The result is recorded as the monitoring result 1305.

Items to be recorded in the management condition database 1300 are not limited to those shown in FIG. 13, and an item can be removed or added as needed.

As has been described, the second embodiment uses the management equipment 1000 to manage the plural crisis monitoring equipments 110 for crisis monitoring. The system according to the second embodiment can thus detect a crisis in an expansive public space from an angry shout or a scream, and reports the detected crisis.

To elaborate, a user who moves out of the communicable area of one crisis monitoring equipment 110 is immediately covered by the next crisis monitoring equipment 110 and thus continuous crisis monitoring is provided. When a crisis is detected, the movement of a user who is in trouble can be tracked and monitored by the plural crisis monitoring equipments 110 throughout the monitoring area. The system according to the second embodiment is therefore capable of making such spaces safe for its users.

Furthermore, privacy is kept well since this system monitors only places where a user who desires monitoring passes.

Third Embodiment

Figure 14:
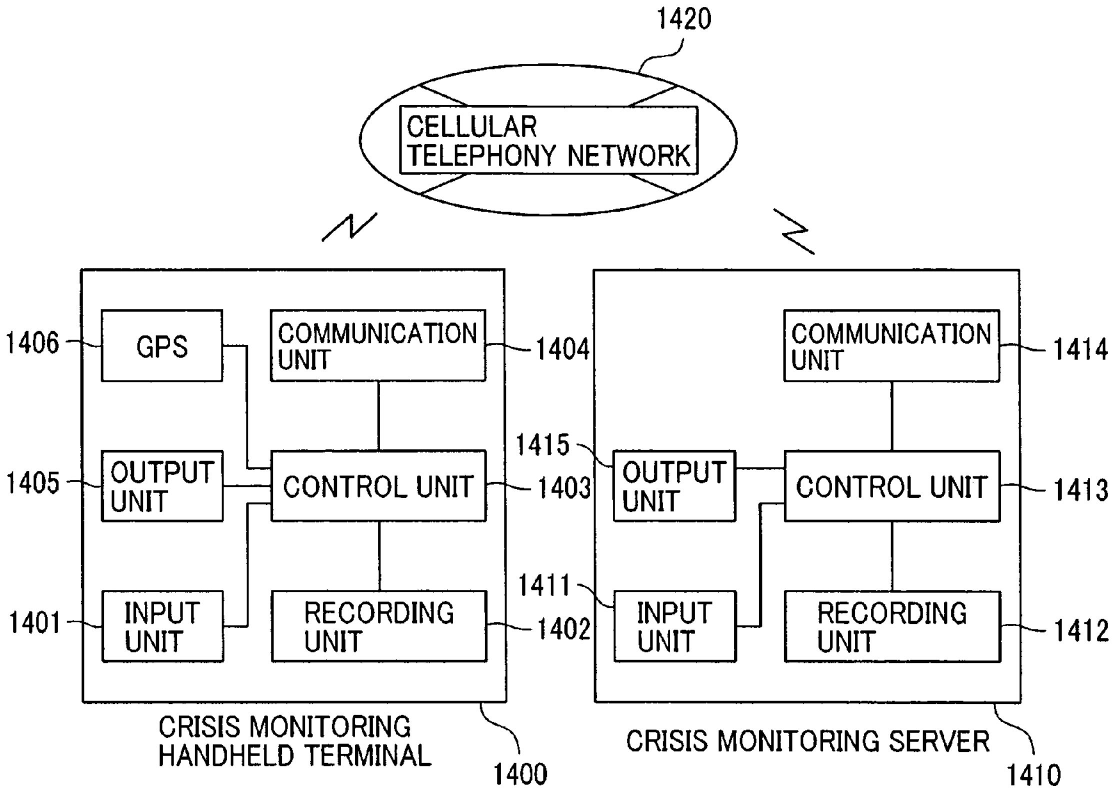
FIG. 14 is a block diagram of a crisis monitoring system according to a third embodiment of this invention.

FIG. 14 is a block diagram of a crisis monitoring system according to a third embodiment of this invention.

In this embodiment, an outdoor public space (e.g. a dark alley) is monitored for a crisis.

A crisis monitoring handheld terminal 1400 is a portable equipment which judges that a user has entered a monitoring area and watches for a crisis in the monitoring area. The crisis monitoring handheld terminal 1400 is carried by a user who desires crisis monitoring. The crisis monitoring handheld terminal 1400 may be built in one of belongings (e.g. cellular phone or wrist watch) of a user who desires crisis monitoring.

The crisis monitoring handheld terminal 1400 is composed of an input unit 1401, a recording unit 1402, a control unit 1403, a communication unit 1404, an output unit 1405 and a GPS receiver 1406.

The input unit 1401 is constituted of input devices such as a microphone through which a user's voice is inputted, a camera by which an image is inputted and a touch panel, a switch, a keyboard or a mouse with which data is inputted.

The recording unit 1402 is constituted of a hard disk or a memory. The recording unit 1402 stores a speech emotion recognition program which analyzes an audio inputted, a personal information management table 900, which contains user's personal information, a condition database 300, audio data, visual data, and a monitoring area database 1900, which is shown in FIG. 19.

The control unit 1403 includes a CPU and executes an emergency processing using the speech emotion recognition program which is stored in the recording unit 1402, when the user is in trouble.

The communication unit 1404 communicates with a crisis monitoring server 1410 via a cellular telephony network 1420. The communication unit 1404 may also be communicable with other external devices.

Figure 17:
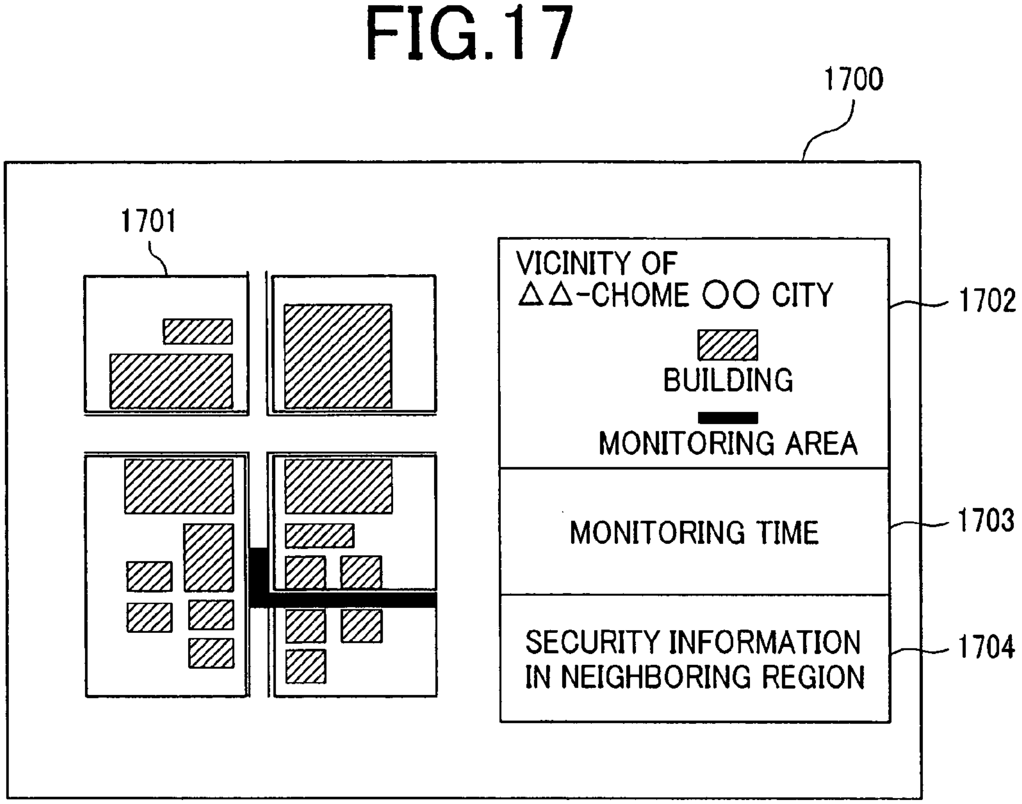
FIG. 17 is a configuration diagram of a monitoring area setting screen according to the third embodiment.
Figure 18:
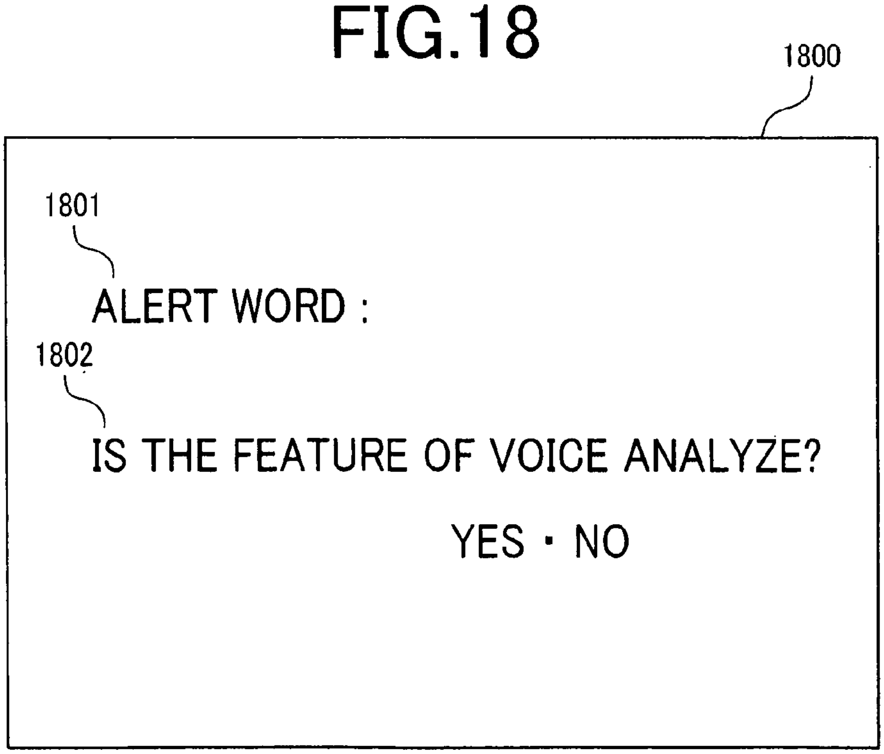
FIG. 18 is a configuration diagram of a personal data setting screen according to the third embodiment.

The output unit 1405 is constituted of a liquid crystal display to display various data concerning crisis monitoring, a monitoring area setting screen 1700 shown in FIG. 17, and a personal data setting screen 1800 shown in FIG. 18, and/or a speaker to output sounds.

The GPS receiver 1406 has an antenna to receive radio wave signals transmitted from GPS satellites and measures the position of the crisis monitoring handheld terminal 1400.

The crisis monitoring server 1410 is a computer equipment to obtain the present condition of the user who is holding the crisis monitoring handheld terminal 1400. A provider that provides the crisis monitoring system of the third embodiment manages the crisis monitoring server 1410.

The crisis monitoring server 1410 is composed of an input unit 1411, a recording unit 1412, a control unit 1413, a communication unit 1414 and an output unit 1415.

The input unit 1411 is constituted of an input device to which an operator input data, such as a touch panel, a switch, a keyboard or a mouse.

The recording unit 1412 is constituted of a hard disk or a memory. The recording unit 1412 stores a speech emotion recognition program, which analyzes an audio inputted, audio data, and visual data.

The control unit 1413 includes a CPU and executes an emergency processing using the speech emotion recognition program which is stored in the recording unit 1412, when the user is in trouble.

The communication unit 1414 communicates with the crisis monitoring handheld terminal 1400 via the cellular telephony network 1420. The communication unit 1414 also communicates with a control center over a cable (e.g. a public switched telephone network or the Internet). The communication unit 1414 may also be communicable with other external devices.

Figures 20, 21:
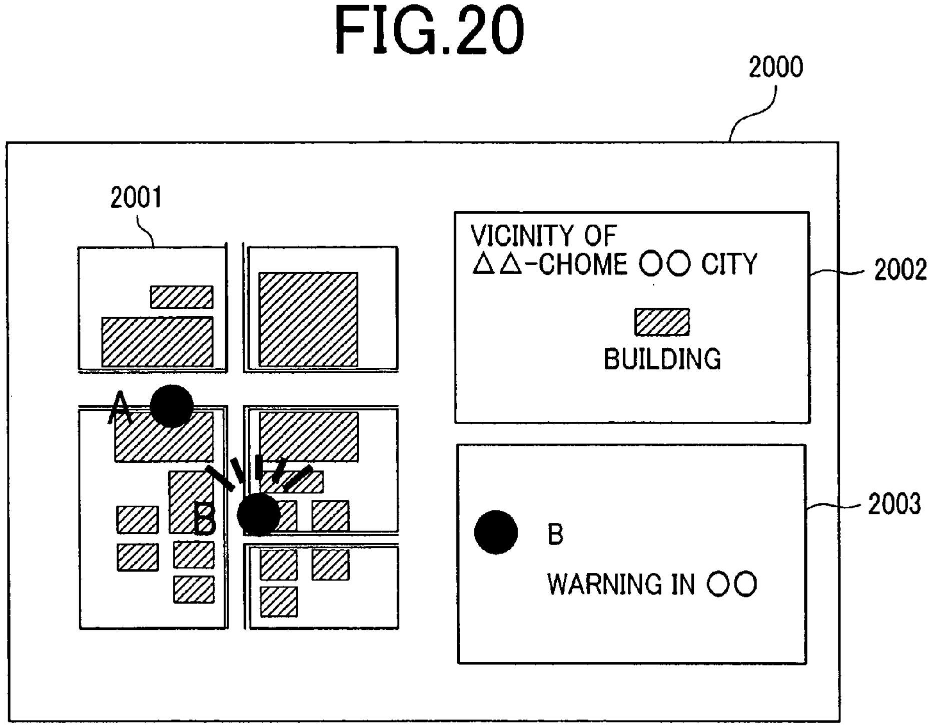
FIG. 20 is a configuration diagram of a monitoring state display screen according to the third embodiment.
FIG. 21 is a configuration diagram of a present condition database according to the third embodiment.

The output unit 1415 is constituted of a liquid crystal display to display various data concerning crisis monitoring and content of a monitoring condition display screen 2000 shown in FIG. 20, and/or a speaker to output sounds.

The cellular telephony network 1420 is used to put information outputted from the crisis monitoring handheld terminal 1400 together in the crisis monitoring server 1410. A wireless LAN, for example, can be employed instead of the cellular telephony network 1420 as long as the replacement can make the information aggregate in the monitoring server 1410.

Figure 15:
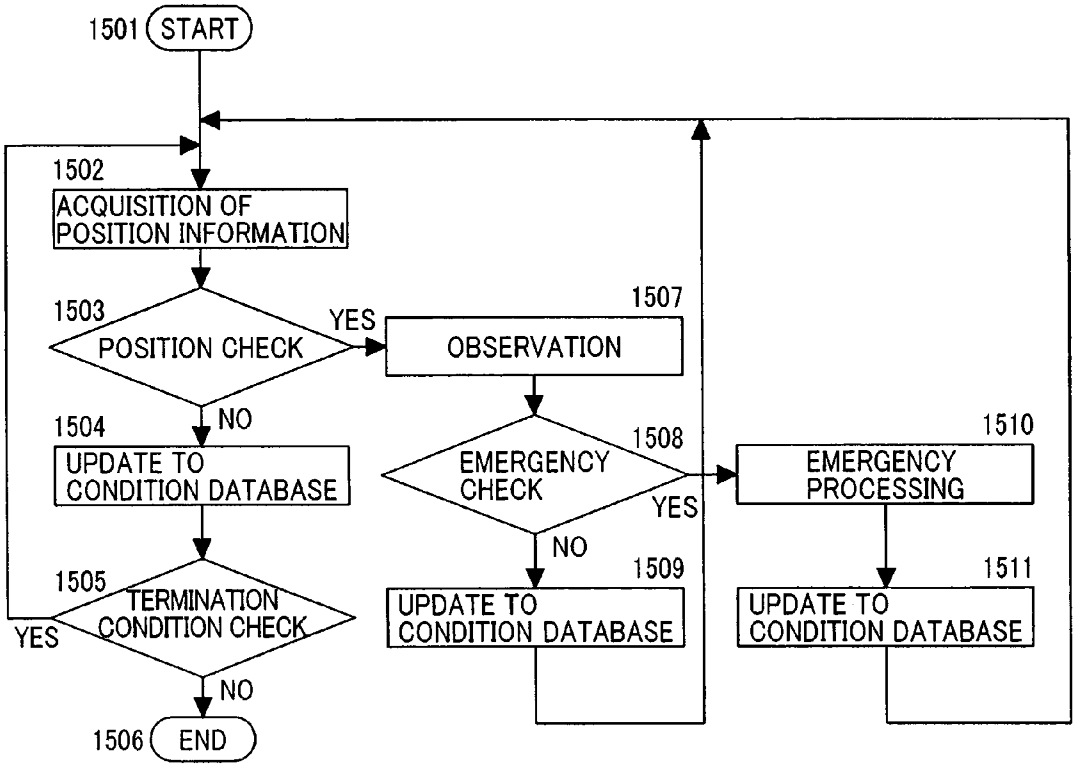
FIG. 15 is a flow chart of processing by a crisis-monitoring, portable terminal according to the third embodiment.

FIG. 15 is a flow chart of monitoring processing by the crisis monitoring handheld terminal 1400.

When the monitoring processing is started (step 1501), the crisis monitoring handheld terminal 1400 checks, at a given timing (e.g. periodically), the user's current position measured by the GPS receiver 1406 (step 1502). Other known methods than the GPS location method may be used to check the position of the crisis monitoring handheld terminal 1400 as long as the apparatus' position can be determined.

The crisis monitoring handheld terminal 1400 then judges whether it is in a monitoring area or not from the obtained position information (step 1503). At this time, the crisis monitoring handheld terminal 1400 refers to a monitoring area that is predetermined in the monitoring area database 1900 stored in the recording unit 1402.

When the crisis monitoring handheld terminal 1400 judges that the terminal has entered a monitoring area, the crisis monitoring handheld terminal 1400 starts observing the user (step 1507).

On the other hand, when the crisis monitoring handheld terminal 1400 judges that the terminal is outside the monitoring area, the crisis monitoring handheld terminal 1400 records the present condition in the condition database 300 of the recording unit 1402 (step 1504).

The communication unit 1404 send, at a given timing (e.g. periodically), the present condition to the crisis monitoring server 1410 via the cellular telephony network 1420. The present condition sent to the crisis monitoring server 1410 may be the entirety of or a part of the condition database 300.

Preferably, the crisis monitoring handheld terminal 1400 sends, along with the present condition, the personal information management table 900, which contains user's personal information, to the crisis monitoring server 1410. The user's personal information should be transmitted using known encoding processing such as public key encryption in order to prevent third parties from reading the personal information.

The crisis monitoring handheld terminal 1400 judges whether to conduct a further position checking (step 1505). In the case where it is detected that the crisis monitoring handheld terminal 1400 is operated to terminate monitoring, the crisis monitoring handheld terminal 1400 ends the process (step 1506). In the case where the crisis monitoring handheld terminal 1400 is to continue operating, on the other hand, the process returns to the step 1502 to keep checking the position of the crisis monitoring handheld terminal 1400.

Upon starting observation (step 1507), the crisis monitoring handheld terminal 1400 executes emotion detection processing based on audio information which is inputted through the input unit 1401 as shown in FIG. 5, to thereby judge whether the user is in trouble (step 1508).

When it is judged that the user is not in any trouble, the crisis monitoring handheld terminal 1400 records the present condition in the condition database 300 (step 1509). The process then returns to the step 1502, where the position of the crisis monitoring handheld terminal 1400 is checked.

On the other hand, when it is judged that the user is in trouble, the crisis monitoring handheld terminal 1400 sends the present condition to the crisis monitoring server 1410 via the cellular telephony network 1420.

In emergency, the control unit 1403 controls the respective units in a prescribed manner.

Specifically, the control unit 1403 controls the communication unit 1404 to send the present condition to the crisis monitoring server 1410. At this time, it is preferable for the communication unit 1404 to also send the present condition recorded in the recording unit 1402 and the user's personal information recorded in the personal information management table 900 to the crisis monitoring server 1410. The user's personal information is transmitted using known encoding processing such as public key encryption in order to prevent third parties from reading the personal information.

The control unit 1403 controls the output unit 1405 to output an audio signal or visual message showing that the alert has been sent to control center.

Preferably, the emergency processing may vary from user to user in accordance with the method recorded in the personal information management table 900.

The control method described above is merely an example, and other control methods may be employed to ensure the safety of users.

As the emergency processing (step 1510) is completed, the crisis monitoring handheld terminal 1400 records the present condition to update the condition database 300 (step 1511). The process then returns to the step 1502, where the crisis monitoring handheld terminal 1400 checks its position.

Audio data inputted through the input unit 1401 is preferably stored in the recording unit 1402. The stored audio data can be used in identifying the person who has committed an offence against the user during observation. A camera may be employed to observe images. Images of the interior of the elevator car picked up by the camera are preferably stored in the recording unit 1402, so that the stored images can be used in identifying a suspect.

However, it is advisable to quickly delete audio, visual or other data stored in the recording unit 1402 in the case where monitoring is ended without detecting any trouble, since the recorded data contains a lot of personal (private) information.

Figure 16:
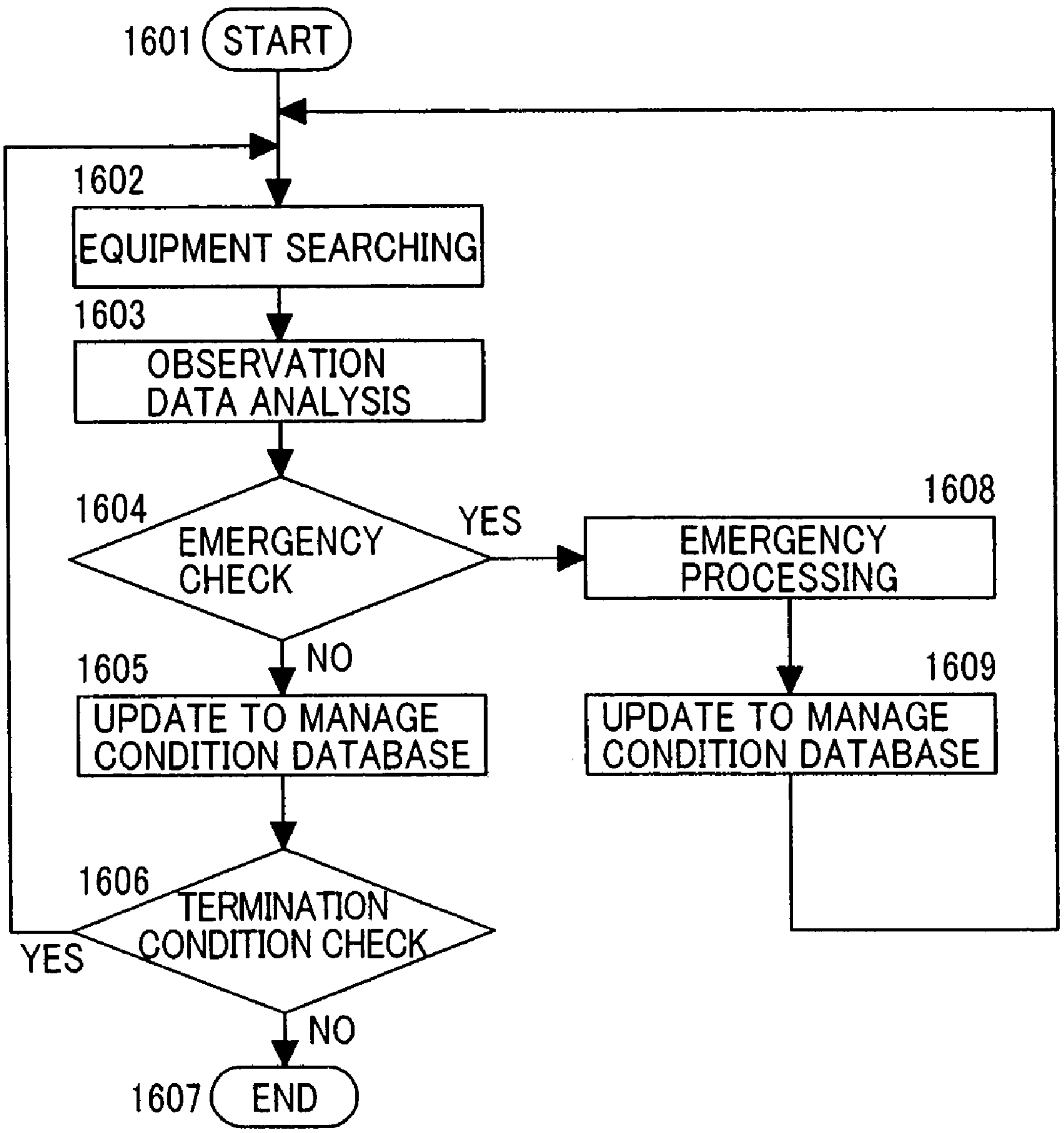
FIG. 16 is a flow chart of processing by a crisis monitoring server according to the third embodiment.

FIG. 16 is a flow chart of processing by the crisis monitoring server 1410.

When the monitoring processing is started (step 1601), the crisis monitoring server 1410 sends an inquiry signal via the cellular telephony network 1420 at a given timing to perform apparatus search processing, which is for finding out whether the crisis monitoring handheld terminal 1400 has entered a monitoring area (step 1602). Alternatively, the crisis monitoring handheld terminal 1400 may send a signal at a given timing to the crisis monitoring server 1410 to inform the server that the handheld terminal has entered a monitoring area.

Upon receiving the inquiry signal from the crisis monitoring server 1410, the crisis monitoring handheld terminal 1400 sends, when in a monitoring area, an observation request and the present condition to the crisis monitoring server 1410. Position information of the crisis monitoring handheld terminal 1400 is periodically sent to the crisis monitoring server 1410 until the crisis monitoring handheld terminal 1400 moves out of the monitoring area.

From the present condition and other observation data sent from the crisis monitoring handheld terminal 1400, the crisis monitoring server 1410 analyzes the position and present condition of the user (step 1603).

The crisis monitoring server 1410 then judges, from the result of analyzing the observation data, whether the user is in trouble or not (step 1604).

When it is judged that the user is not in any trouble, the crisis monitoring server 1410 records the present condition of the crisis monitoring handheld terminal 1400 in a present condition database 2100 (step 1605). The present condition to be recorded is sent by the communication unit 1414 to the control center at a given timing. The present condition sent to the control center may be the entirety of or a part of the present condition database 2100.

Thereafter, the crisis monitoring server 1410 judges, through termination judging processing, whether to conduct a further search for the crisis monitoring handheld terminal 1400 (step 1606). In the case where the crisis monitoring server 1410 is to stop operating (for example, when a command to stop observation is inputted), the crisis monitoring server 1410 stops the monitoring processing (step 1607). On the other hand, in the case where the crisis monitoring server 1410 is to continue operating, the processing returns to the step 1602 to continue searching for the apparatus.

On the other hand, when it is judged in the step 1603 that the user is in trouble, the crisis monitoring server 1410 follows emergency response 311 set in the condition database 300 and executes an emergency processing such as alerting the control center, a local security company, or a contracted security company (step 1607).

Preferably, the communication unit 1414 sends the record in the current database 300 that has been sent from the crisis monitoring handheld terminal 1400 to the control center via the cellular telephony network 1420.

In emergency, the control unit 1413 controls the respective units in a prescribed manner.

Specifically, the control unit 1413 controls the communication unit 1414 to alert the control center. At this time, preferably, the communication unit 1414 also sends, to the control center, the present condition recorded in the recording unit 1412 and the user's personal information recorded in the personal information management table 900.

The control unit 1413 controls the output unit 1415 to output an audio signal or visual message showing that the alert has been sent to control center.

The control method described above is merely an example, and other control methods can be employed to ensure the safety of users.

As the emergency processing (step 1608) is completed, the crisis monitoring server 1410 records the present condition of each crisis monitoring equipment 110 in the present condition database 2100 (step 1609). Then the processing returns to the step 1602, where the crisis monitoring server 1410 searches for the apparatus.

Instead of the crisis monitoring server 1410, the crisis monitoring handheld terminal 1400 may judge a crisis through the emotion detection processing of FIG. 5 based on a user's voice and/or image observed. Specifically, the crisis monitoring handheld terminal 1400 sends an observation result 306 and a monitoring result 307, which is determined based on the observation result 306, to the crisis monitoring server 1410.

When the crisis monitoring server 1410 judges whether a user is in trouble, the crisis monitoring server 1410 may receive the user's voice and/or image observed by the crisis monitoring handheld terminal 1400, and performs the emotion detection processing shown in FIG. 5 on the received data with the use of the speech emotion recognition program stored in the recording unit 1412.

FIG. 17 is a configuration diagram of the monitoring area setting screen 1700.

The monitoring area setting screen 1700 is a screen to set monitoring area information and monitoring time information with the use of a GUI (graphical user interface). The monitoring area setting screen 1700 is displayed on the liquid crystal display of the output unit 1405 of the crisis monitoring handheld terminal 1400.

Map information 1701 of a region in which a monitoring area is set is displayed on the monitoring area setting screen 1700. The use of a map makes it possible to set a monitoring area, even when the geographic name of an area in which the user desires monitoring is unknown, by looking up the map for the objective area. The range set as the monitoring area is displayed in a specific color to make it easy to distinguish the monitoring area from other areas.

Also displayed on the monitoring area setting screen 1700 are the geographical name of the area set as the monitoring area, and a symbol description 1702 of the map information 1701.

A monitoring time period 1703 to be set is displayed on the monitoring area setting screen 1700. Once the monitoring time period 1703 is set, monitoring is started when the crisis monitoring handheld terminal 1400 enters the monitoring area within this set time.

Security information in neighboring region 1704 displayed on the monitoring area setting screen 1700 is information about the neighboring region shown in the map information 1701. The security information in neighboring region 1704 shows past inappropriate actions (e.g. molestation and robbery) in the neighboring region to be consulted by the user in setting a monitoring area and a monitoring time.

A personal computer, for example, may be used to set a monitoring area and a monitoring time instead of the crisis monitoring handheld terminal 1400. In the case where a monitoring area is set through other terminal than the crisis monitoring handheld terminal 1400, the set information is transferred to the crisis monitoring handheld terminal 1400 via other equipment that is connected to the crisis monitoring handheld terminal 1400 or via a communication line (e.g. the Internet).

The monitoring area setting screen 1700 is merely an example of a measure to set such information as a monitoring area, and may be replaced by other interfaces (e.g., a command line interface) as long as a monitoring area and a monitoring time can be set.

The crisis monitoring handheld terminal 1400 records the set information in the recording unit 1402. In the case where plural types of set information are to be recorded, the monitoring area database 1900 shown in FIG. 19 may be used to keep the record.

FIG. 18 is a configuration diagram of the personal data setting screen 1800.

The personal data setting screen 1800 is a screen to set personal information of the user who holds the crisis monitoring handheld terminal 1400 with the use of a GUI. The personal data setting screen 1800 is displayed on the liquid crystal display of the output unit 1405 of the crisis monitoring handheld terminal 1400.

The personal data setting screen 1800 includes an input field for an alert word 1801. The alert word inputted to the input field 1801 is set in the alert word 905 included in the personal information management table 900 shown in FIG. 9.

The personal data setting screen 1800 also shows an selection 1802 about whether to analyze a feature amount of the voice of the user who holds the crisis monitoring handheld terminal 1400. When "Yes" is chosen to the selection 1802, a sound which the user might utter in a crisis situation (e.g. a cry) is inputted through the microphone of the input unit 1401 and a feature of the sound is analyzed. The analyzed variable data is recorded in the variable values 906 to 910 of the personal information management table 900 to be used in the emotion detecting processing during observation. When "No" is chosen to the selection 1802, the analysis of the user's voice is skipped.

A personal computer, for example, may be used to set personal information instead of the crisis monitoring handheld terminal 1400. In the case where personal information is set through other terminal than the crisis monitoring handheld terminal 1400, the set information is transferred to the crisis monitoring handheld terminal 1400 via other equipment that is connected to the crisis monitoring handheld terminal 1400 or via a communication line (e.g. the Internet).

Items that can be set on the personal data setting screen 1800 are not limited to those shown in FIG. 18 and, when an item is added to the personal information management table 900, a relevant item is added to the personal data setting screen 1800.

The personal data setting screen 1800 is merely an example of a measure to set personal information. Other interfaces (e.g. a command line interface) may be employed instead as long as an alert word can be set and a user's voice can be inputted.

FIG. 19 is an explanatory diagram of the monitoring area database 1900.

The monitoring area database 1900 includes a monitoring setting number 1901, an address 1902, latitude 1903 longitude 1904 and a time period 1905. The monitoring setting number 1901 is the number assigned to each of plural monitoring areas and monitoring time periods set by the user who holds the crisis monitoring handheld terminal 1400.

The address 1902 is the address of a set monitoring area. The latitude 1903 is the latitude of a set monitoring area. The longitude 1904 is the longitude of a set monitoring area.

The time period 1905 is set monitoring timings. The crisis monitoring handheld terminal 1400 starts observing upon entering a monitoring area that is determined by data set as 1902 to 1904 in a time period set as 1905 by the user who holds the crisis monitoring handheld terminal 1400.

The monitoring area database 1900 is thus used to manage set information in the form of a database when a user sets plural monitoring areas and monitoring time periods.

FIG. 20 is a configuration diagram of the monitoring condition display screen 2000.

The monitoring condition display screen 2000 is a screen to display the present condition of the user who holds the crisis monitoring handheld terminal 1400 with the use of a GUI. The monitoring condition display screen 2000 is displayed on the liquid crystal display of the output unit 1415 of the crisis monitoring server 1410.

The display screen 2000 displays map information 2001 of an area set as a monitoring area. The present condition (e.g. position information) of the user holding the crisis monitoring handheld terminal 1400 is shown on the map information 2001. The range set as the monitoring area is displayed in a specific color to make it easy to distinguish the monitoring area from other areas.

Also displayed on the display screen 2000 are the geographical name of the area set as the monitoring area, and a symbol description 2002 of the map information 2001.

Crisis-regarding data 2003 including personal information of the user who holds the crisis monitoring handheld terminal 1400, emergency response, and the user's present condition is displayed in text on the monitoring condition display screen 2000.

Displaying a monitoring condition with the use of a GUI in this way enables the crisis monitoring server 1410 to obtain the present condition of the user in present time.

The monitoring condition display screen 2000 is merely an example of a measure to display information on a user in a monitoring area, and may be replaced by other interfaces (e.g. a command line interface) as long as the replacement is capable of displaying the user's present condition.

FIG. 21 is a configuration diagram of the present condition database 2100.

The present condition database 2100 includes a user ID 2101, a user name 2102, a location 2103, a operative condition 2104 and a monitoring result 2105. The user ID 2101 is the number assigned to each crisis monitoring handheld terminal 1400. The user name 2102 is the name of a user who holds the crisis monitoring handheld terminal 1400, that is a monitoring subject. The location 2103 is where the crisis monitoring handheld terminal 1400 is located at present.

The operative condition 2104 is the present operative condition of each crisis monitoring handheld terminal 1400. "Waiting" is recorded as the operative condition 2104 for the crisis monitoring handheld terminal 1400 that has not started observation yet. Each crisis monitoring handheld terminal 1400 enters an "waiting" state when, for example, a user holding this crisis monitoring handheld terminal 1400 is outside an area he/she has set as a monitoring area, or when a user holding the crisis monitoring handheld terminal 1400 is in an area he/she has set as a monitoring area but does not want observation. When a user carrying the crisis monitoring handheld terminal 1400 enters a monitoring area and the crisis monitoring handheld terminal 1400 starts observation, "observing" is recorded as the operative condition 2104.

The monitoring result 2105 is a result of the judgment made on whether there is a disturbance or not from a user's voice and/or image observed by the crisis monitoring handheld terminal 1400.

The present condition database 2100 can include other items than those shown in FIG. 21, and an item is removed or added as necessary.

As has been described above, the system according to the third embodiment, in which the crisis monitoring handheld terminal 1400 having the function of the crisis monitoring equipment 110 is built in a cellular phone or a similar handheld terminal that a user holds, can detect from an angry shout or a cry that the user makes in trouble while the user is outdoor, and reports the detected crisis. The system according to the third embodiment is therefore capable of making outdoor spaces safe for its users.

Preferably, the crisis monitoring server 1410 constantly monitors for a crisis in a public space prone to crimes since a crisis can happen anytime. Constant monitoring, however, involves the problem of an invasion of privacy by catching users' voices and images when they do not desire crisis monitoring.

This problem is cleared by carrying out monitoring crisis only in a monitoring area specified by a user in advance with the use of the GPS system. Thus the crisis monitoring system is made available to a user only when the user desires monitoring.

The system that monitors for a limited period is also free from another drawback of constant monitoring, which is an increased chance of making an erroneous crisis judgment due to noise irrelevant to crisis monitoring and prolonged sound analysis time.

While the present invention has been described in detail and pictorially in the accompanying drawings, the present invention is not limited to such detail but covers various obvious modifications and equivalent arrangements, which fall within the purview of the appended claims.

What is claimed is:

1. A crisis monitoring apparatus to judge whether a person is in a crisis situation, comprising an input unit, a recording unit, and a control unit to judge whether a person is in a crisis situation, wherein the input unit receives an audio signal, the recording unit records emotion attribute information, which includes a feature of a specific emotion in an audio signal, as information necessary to judge a crisis situation, and the control unit controls the input unit and the recording unit, determines a person's emotion by comparing an audio signal inputted to the input unit with the emotion attribute information, and executes a predetermined emergency processing when the determined emotion indicates a crisis situation, wherein the recording unit records an audio signal inputted to the input unit, and wherein the control unit:

deletes the audio signal recorded in the recording unit after a predetermined time elapses, when the determined emotion does not indicate a crisis situation; and keeps to record the audio signal recorded in the recording unit after the predetermined time elapses, when the determined emotion indicates a crisis situation.

2. The crisis monitoring apparatus according to claim 1, further comprising a communication unit which communicates with an external device, wherein the control unit starts crisis monitoring when the communication unit receives a monitoring starting instruction.

3. The crisis monitoring apparatus according to claim 1, further comprising a locating unit which determines a location of the crisis monitoring apparatus, wherein the control unit starts crisis monitoring when the locating unit detects that the crisis monitoring apparatus locates at a predetermined point.

4. The crisis monitoring apparatus according to claim 1, further comprising an output unit which sends notification that the determined emotion indicates a crisis situation.

5. The crisis monitoring apparatus according to claim 2, wherein the communication unit communicates via a mobile communications network.

6. A crisis monitoring system to judge whether a person is in a crisis situation, comprising a crisis monitoring apparatus and a crisis monitoring terminal, wherein a crisis monitoring apparatus comprises an input unit, a recording unit and a control unit, the input unit receives an audio signal, the recording unit records emotion attribute information, which is information about a feature of a specific emotion in an audio signal, as information necessary to judge a crisis situation, and the control unit controls the input unit and the recording unit, determines a person's emotion by comparing an audio signal inputted to the input unit with the emotion attribute information, and executes a predetermined emergency processing when the determined emotion indicates a crisis situation, wherein the recording unit records an audio signal inputted to the input unit, and wherein the control unit:

deletes the audio signal recorded in the recording unit after a predetermined time elapses, when the determined emotion does not indicate a crisis situation; and keeps to record the audio signal recorded in the recording unit after the predetermined time elapses, when the determined emotion indicates a crisis situation.

7. The crisis monitoring system according to claim 6, wherein the crisis monitoring apparatus further comprises a communication unit which communicates with the crisis monitoring terminal, and the control unit starts crisis monitoring when the communication unit receives a monitoring starting instruction from the crisis monitoring terminal.

8. The crisis monitoring system according to claim 6, further comprising a management apparatus which collects information from the crisis monitoring apparatus, wherein the control unit controls to send, to the management apparatus, a message reporting that a crisis has happened, when the determined emotion indicates a crisis situation, and the management apparatus executes a predetermined emergency processing, when the management apparatus detects a crisis situation from the information sent by the crisis monitoring apparatus.

9. The crisis monitoring system according to claim 6, further comprising a locating unit which locates the crisis monitoring apparatus, wherein the control unit starts crisis monitoring when the locating unit detects that the crisis monitoring apparatus locates at a predetermined point.

10. The crisis monitoring system according to claim 6, further comprising an output unit which sends notification that the determined emotion indicates a crisis situation.

11. A method of monitoring a crisis for a crisis monitoring system which comprises a crisis monitoring apparatus comprising an input unit to input an audio signal, a recording unit to record emotion attribute information, which include a feature of a specific emotion in an audio signal, and a control unit to control the input unit and the recording unit, the method comprising:

determining a person's emotion by comparing an audio signal inputted to the input unit with the emotion attribute information, judging whether the determined emotion indicates a crisis situation, executing an emergency processing following a predetermined method when it is judged that the determined emotion indicates a crisis situations;

deleting the audio signal recorded in the recording unit after a predetermined time elapses, when the determined emotion does not indicate a crisis situation; and keeping to record the audio signal recorded in the recording unit after the predetermined time elapses, when the determined emotion indicates a crisis situation.

12. The method according to claim 11, wherein the crisis monitoring system further comprises a crisis monitoring terminal hold by a user who desires crisis monitoring, and wherein the method further comprises starting crisis monitoring when a monitoring starting instruction is received from the crisis monitoring terminal.

13. The method according to claim 11, wherein the crisis monitoring system further comprises a management apparatus which collects information from the crisis monitoring apparatus, and wherein the method further comprises:

sending, to the management apparatus, a message reporting that a crisis has happened, when the determined emotion indicates a crisis situation; and executing a predetermined emergency processing, when the management apparatus detects a crisis situation from the information sent by the crisis monitoring apparatus.

14. The method according to claim 11, wherein the crisis monitoring system further comprises a management apparatus which collects information from the crisis monitoring apparatus, wherein the method further comprises:

sending, to the management apparatus, information of the audio signal inputted to the input unit;

determining a person's emotion by comparing the audio information sent from the crisis monitoring apparatus with a feature of a specific emotion in an audio signal; and executing a predetermined emergency processing when it is judged that the determined emotion indicates a crisis situation.

15. The method according to claim 11, wherein the crisis monitoring system further comprises a locating unit which determines a location of the crisis monitoring apparatus, and wherein the method further comprises starting crisis monitoring when the locating unit detects a predetermined point.

16. The method according to claim 11, wherein the crisis monitoring system further comprises an output unit wherein the method further comprises sending notification that the determined emotion indicates a crisis situation.

* * * * *